United States Patent Office 3,641,126
Patented Feb. 8, 1972

3,641,126
PROCESS FOR PREPARATION OF ETHANE-1-HYDROXY - 1,1,2-TRIPHOSPHONATES FROM ETHANECARBONYL-1,2-DIPHOSPHONATES
James B. Prentice, Batesville, Ind., assignor to The Procter & Gamble Company, Cincinnati, Ohio
No Drawing. Filed Dec. 23, 1968, Ser. No. 786,370
Int. Cl. C07f 9/38; C11d 3/36
U.S. Cl. 260—502.4 A                    7 Claims

ABSTRACT OF THE DISCLOSURE

Process for preparing ethane-1-hydroxy-1,1,2-triphosphonates which comprises reacting ethanecarbonyl-1,2-diphosphonic acid with at least one inorganic phosphorus-containing compound which is a phosphorous acid precursor alone or in admixture with phosphorous acid and hydrolyzing the reaction product obtained.

BACKGROUND

Ethane - 1 - hydroxy - 1,1,2-triphosphonic acid and its salts, hereinafter referred to as EHTP, are useful as sequestering and complexing agents as well as builders in detergent compositions. These embodiments are fully described in U.S. Pat. 3,400,148. Because EHTP has such useful properties, improved alternative methods of making EHTP economically, quickly and easily are of importance. The present invention relates to a process for preparing such EHTP compounds.

The process of making EHTP described in U.S. Pat. 3,400,148 employs phosphonoacetic acid as a starting reagent. While satisfactory in most respects, such a process does involve the factor of the high cost of phosphonoacetic acid.

Another method of making EHTP is disclosed in a copending, commonly assigned patent application filed Mar. 27, 1968, by Cilley et al., "A Method Of Making Triacid Halides Of Phosphonoacetic Acid," U.S. Ser. No. 716,339. While the synthesis disclosed in Cilley et al. is satisfactory, the use of ketene as an essential reactant imposes certain limitations on the process. For example, since ketene boils at —41° C., the synthesis requires extremely low reaction temperatures. Moreover, ketene, which has a tendency to polymerize on standing, is presently not available commercially.

The present invention avoids the foregoing disadvantages of previously known methods of preparing EHTP and has as its object a process which offers high yields, a rapid rate of reaction, with relatively less expensive starting reactants.

SUMMARY

It has now been discovered that ethane-1-hydroxy-1,1,2-triphosphonic acid (referred to hereinafter as EHTP) can be prepared by reacting an ethanecarbonyl-1,2-diphosphonic acid compound (referred to hereinafter as ECnDP) with at least one inorganic phosphorous-containing compound which is phosphorous acid ($H_3PO_3$), or a phosphorous acid precursor in an organic solvent. The reaction requires anhydrous, acidic conditions and the use of an organic solvent. The reaction temperature should be in the range of 30° C. to 160° C.

DETAILED DESCRIPTION OF THE INVENTION

The invention pertains to a process for making EHTP which comprises reacting an ethanecarbonyl - 1,2-diphosphonic acid (ECnDP) with at least one inorganic phosphorus-containing compound which is phosphorous acid or a phosphorous acid precursor at a temprature in the range of from about 30° C. to about 160° C. in an organic solvent under substantially anhydrous, acidic reaction conditions to form a condensate reaction product and thereafter hydrolying said condensate to form ethane-1-hydroxy-1,1,2-triphosphonic acid.

Ethanecarbonyl - 1,2 - diphosphonic acid (ECnDP) is believed to be a novel compound and is the subject of a copending, commonly assigned patent application Ser. No. 786,428, filed concurrently herewith by James B. Prentice as "Ethane Carbonyl-1,2-Diphosphonic Acid, Water-Soluble Salts Thereof And Process For Preparation," which is incorporated herein by reference. The process of making such compounds is specifically demonstrated below by examples and comprises reacting a 2-haloethane - 1 - hydroxy-1,1-diphosphonic acid, e.g., 2-chloroethane - 1 - hydroxy - 1,1-diphosphonic acid, with at least 3 equivalents of a base having a $pK_b$ up to about 10. The reaction proceeds, it is believed, through the formation of an intermediate reaction product which is an epoxy compound believed to have a formula

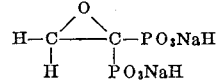

which epoxy compound rearranges during the reaction to form ethanecarbonyl-1,2-diphosphonate.

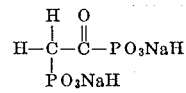

The ethanecarbonyl compound which is used in the present invention to react with an inorganic phosphorus compound is the acid, i.e., ethanecarbonyl - 1,2 - diphosphonic acid. The present invention must be carried out under acidic conditions. While a salt of the foregoing acid can be used, only those salts of ethanecarbonyl-1,1-diphosphonic acid can be used which comply with this requirement that the system must be acid.

The inorganic phosphorus-containing compound which is reacted with the ethanecarbonyl - 1,2-diphosphonic acid is phosphorous acid or a phosphorous acid precursor or mixtures thereof.

The phosphorous acid precursors which are used in the present invention alone or in admixture with the $H_3PO_3$ are compounds which, upon reaction with hydroxyl groups from any source (e.g., on phosphorus as in phosphonate groups, —$PO(OH)_2$, on carbon as in carboxyl groups, —COOH, or in limited amounts of water, HOH), form anhydride bonds such as phosphorus-oxygen-phosphorus (P—O—P) and phosphorous-oxygen-carbon (P—O—C) and are sometimes accompanied by elimination of hydrochloric acid or a carboxylic acid.

Examples of phosphorous acid precursors useful herein are acid halides such as phosphorus halides, e.g., phosphorus mono-, di-, and trichlorides, and the corresponding bromides. Phosphorous acid anhydrides are also useful in the present invention as phosphorous acid precursors. Anhydrides of phosphorous acid are dehydration products of phosphorous acid, $H_3PO_3$. Ordinarily, dehydration products of phosphorous acid are characteristically represented by an expression showing the number of molecules of water which have been removed from a given amount of the acid.

For example, typical references to anhydrides are:

(a) $2H_3PO_3$—$1H_2O$ which defines a pyrophosphorous acid molecule,

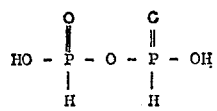

(b) trimetaphosphite, $3H_3PO_3$—$3H_2O$

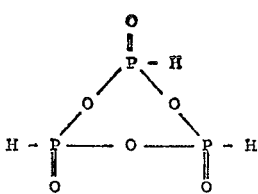

(c) $4H_3PO_3$—$4H_2O$ which can be thought of as representing a molecular arrangement, such as tetrametaphosphite:

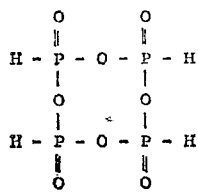

(d) $4H_3PO_3$—$6H_2O$, which represents the most condensed form of an anhydride of phosphorus acid, is called phosphorous anhydride. It has a formula $P_4O_6$, a melting point of 24–25° C., and is represented structurally as follows:

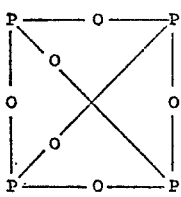

Two essential criteria have been discovered in connection with the reaction between the ethanecarbonyl-1,2-diphosphonate reactant and inorganic phosphorus-containing compound (phosphorous acid, a precursor thereof, or a mixture of phosphorous acid and a precursor thereof):

(1) The reactants must be present in substantially stoichiometric amounts which provide a molar ratio of one mole of ethanecarbonyl-1,2-diphosphonic acid per each atom of phosphorus in the inorganic phosphorus-containing reactant; and, (2) The reactants must be present in a proportion which provides an anhydrizing power (a term defined below) of from about 1 to about 4 for each mole of ethane-1-hydroxy-1,1,2-triphosphonic acid formed by the reaction.

The reaction calls for the use of stoichiometric proportions of the reactants. By way of illustration where the phosphorus acid precursor is phosphorus trichloride, the stoichiometry is one mole of ethanecarbonyl-1,2-diphosphonic acid to one mole of phosphorus trichloride, $PCl_3$. When the phosphorus acid precursor is phosphorus trioxide ($P_4O_6$), stoichiometry is four moles of ethanecarbonyl-1,2-diphosphonic acid to one mole phosphorus trioxide.

If stoichiometry is exceeded, the excess of a reactant is present as an impurity in the reaction product. Such impurities are undesirable and detract from the overall yield of the desired products. Depending upon which inorganic phosphorus-containing compound is used in the reaction system, it is necessary to adjust the amount of each reactant to achieve compliance with stoichiometric requirements.

According to the present invention, the anhydrizing power of the reaction system must be from about 1 to about 4, preferably from about 1.5 to 3.5 with the optimum being 2. For purposes of the present invention, the term "anhydrizing power" is defined as the total number of anhydride bonds, potential and actual, in the reactants, per mole of ethane - 1-hydroxy-1,1,2-triphosphonic acid formed by the reaction.

Potential anhydride bonds are those which are, for example, in acid halides such as acid chlorides or acid bromides. They can be present, for example, as

Each such moiety is able to form in the reaction system one anhydride bond like P—O—P or P—O—C. Hence, an acid halide such as

contributes one unit of anhydrizing power to the reaction mixture. If one of the reactants already contains an actual anhydride bond, e.g., the P—O—P linkage in

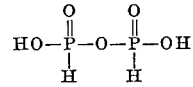

that reactant contributes one anhydrizing bond or unit to the reaction system. By way of further example, the total anhydrizing power contributed to a reaction by a mole of $P_4O_6$ is 6, and by a mole of $PCl_3$ is 3.

Within the broadest terms of the present invention, it is to be noted that the reaction system can comprise two reactants, or even more, provided that the foregoing reaction system requirements are complied with, i.e., necessary stoichiometric proportions and anhydrizing power. The following reaction systems illustrate the flexibility of the present invention:

(1) 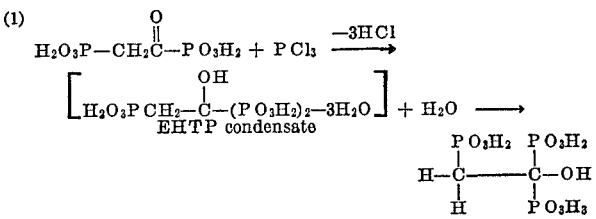

(2) 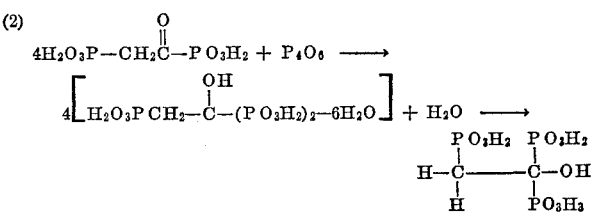

As mentioned above, the reaction which comprises the present invention should be run under substantially anhydrous conditions. The product formed by the reaction between ethanecarbonyl-1,1-diphosphonate and the inorganic phosphorus-containing reactant under the above-described reaction conditions is a condensate of ethane-1-hydroxy-1,1,2-triphosphonic acid. As used herein, the term "condensate" means a reaction product which is two or more moles of ethane-1-hydroxy-1,1,2-triphosphonate joined by ether (C—O—C), ester (C—O—P), and/or anhydride (P—O—P) bonds. Such condensates are readily and quantitatively converted to the free acid of ethane-1-hydroxy-1,1,2-triphosphonate by hydrolysis, i.e., by heating in the presence of water. It should be stated here that condensates of ethane-1-hydroxy - 1,1,2 - triphosphonate, rather than ethane-1-hydroxy - 1,1,2 - triphosphonic acid itself, are the inherent products of this reaction. Thus, it is obvious that the anhydrizing power introduced by the starting reagents is reflected in the final condensate product, and is necessary for complete reaction.

According to the present invention, the reaction is in an organic solvent. The solvent should be a polar solvent and be substantially inert. The phosphorus-containing reactant should be more reactive with the ethanecarbonyl compound than with the solvent. Any such solvent can be used, but preferably the solvent should have a boiling temperature above the reaction temperature being employed.

The materials which are preferred as solvents in the reaction system are such compounds as acetic acid (as discussed below), di-n-propyl sulfone, tetramethylene sulfone, dibutyl oxide, bis-2-methoxyethyl ether (diglyme), nitrobenezne, 1,1,2,2-tetrachloroethane and diphenyl oxide. Of these, n-propyl sulfone, tetramethylene sulfone, and 2,2'-dimethoxydiethyl ether are the most preferred. Other sulfones can be used also together with other low alkyl or aryl ether compounds. Materials such as tetrahydrofuran, di-n-propyl ether, and dioxane also can be used satisfactorily. If the solvent boils off during the reaction, steps are necessary to be taken to continuously replace the solvent driven off.

Besides being polar, the solvent is relatively inert to the reactants and the reaction intermediates. For example, dimethyl formamide, which might otherwise be suitable because it is a polar, high-boiling compound, is not used in the present invention because it reacts with reactants such as $PCl_3$, $P_4O_6$, and trimetaphosphite, forming unwanted products.

The requirement for chemical inertness to reactants and anhydride intermediates excludes compounds such as: (1) aldehydes and ketones because they undergo reactions which would be likely to convert the

(2) alcohols, primarily and secondary amines because they are acylated by acid halides or anhydrides. These compounds tend to react and thereby consume reactants and making unwanted impurities. Certain other polar organic compounds have been tried and found reactive, namely, acetonitrile, formamide, dimethylformamide, and dimethylsulfoxide.

In addition to the solvents mentioned above, acetic acid can also be used. While it can react with the phosphorus-containing reactants mentioned above, it does so at a slower rate than the reaction between ethanecarbonyl-1,2-diphosphonate and the phosphorus compound. For this reason, the acetic acid does not interfere with the desired reaction.

Moreover, acetyl chloride can likewise be used above as a solvent for this reaction system or in combination with acetic acid. It can provide a special advantage in compositions in acetic acid per se in that acetyl chloride can be used to contribute anhydrizing power to the reaction. For example, in a reaction between ethanecarbonyl-1,2-diphosphonate and phosphorous acid in acetic acid, it is possible to add acetyl chloride to the system and provide the necessary anhydrizing power. This can be achieved according to the following equation:

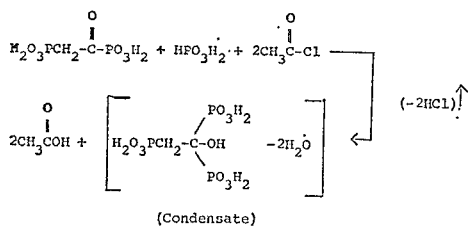

(Condensate)

It has been discovered that the amount of solvent which is used is not critical, provided that enough is used to allow adequate stirring. The reaction results in the formation of ethane-1-hydroxy-1,1,2-triphosphonic acid even if small amounts of solvent are present. As a general rule, the solvent can be used in a proportion of from about ½ to about 5, and preferably from 1 to 3 times the weight of total reactants.

A mixture of the reactants is heated to a temperature of from about 30° C. to about 160° C. for a period of from about 5 minutes to about 24 hours. Preferably, the reaction temperature is in the range of from about 50° C. to about 140° C. for from about ¼ hour to about 12 hours.

Temperatures less than 30° C. require longer reaction times or the reaction is not completed. Reaction temperatures above 160° C. cause the formation of phosphate compounds which, for purposes of the present invention, are considered as impurities. Of course, if the ultimate use to which the ethane-1-hydroxy-1,1,2-triphosphonate compound is to be put can tolerate the presence of these reaction by-products, then the present invention can be practiced outside of the aforementioned temperature and time limits without departing from the spirit of the present invention. Thus, for example, if it is desired to prepare a reaction mixture of a blend of phosphates and phosphites (some intermediate reaction products are believed to be phosphites) together with ethane-1-hydroxy-1,1,2-triphosphonic acid, then the reaction conditions can be suitably adjusted as described above to provide such compositions.

The reaction product as mentioned above is a condensate of ethane-1-hydroxy-1,1,2-triphosphonic acid. The condensate is readily hydrolyzed to ethane-1-hydroxy-1,1,2-triphosphonic acid by any hydrolysis technique. For example, hydrolysis occurs most conveniently by reaction with water at a temperature in the range of 25° C. to about 120° C., and preferably from about 60° C. to 100° C. The amount of water employed for this hydrolysis step is not critical. The desired amount can be easily determined by taking into consideration the amount of condensate which is formed in the reaction. The proportion of water which is normally used for hydrolysis is a stoichiometric amount sufficient to insure complete hydrolysis.

A preferred embodiment of the invention is to use an acetic acid solvent. In practicing this embodiment and following hydrolysis, the procedure is to dry off the water and add sufficient alkali to form the disodium salt ($Na_2H_4$) of ethane-1-hydroxy-1,1,2-triphosphonic acid. This salt crystallized readily from the acetic acid organic phase.

When a solvent such as n-propyl sulfone and the like is used the condensate of ethane-1-hydroxy-1,1,2-triphosphonic acid crystallizes readily. Following crystallization the mixture is filtered to recover the condensate which then is readily hydrolyzed as discussed above.

Ethane-1-hydroxy-1,1,2-triphosphonic acid can be readily converted to a desired salt form by neutralizing the acid with any base material such as sodium hydroxide, potassium hydroxide, lithium hydroxide, ammonium hydroxide and the like including equivalent base compounds.

The invention now is further illustrated by the following examples. However, it should be understood that these are given merely by way of explanation, not of limitation, and that numerous changes may be made in the details without departing from the spirit and the scope of the invention as hereinafter claimed.

The ethanecarbonyl-1,2-diphosphonic acid used in Example I was prepared in the following manner.

The $Na_4$ salt of ethanecarbonyl-1,2-diphosphonate (2.50 g. of 57.6% and ≅0.05 mole) was passed through 300 cc. of Dowex 50W-8 α cation exchange resin in the H+ form and the column rinsed until the effluent was neutral. The aqueous solution was concentrated on the rotary evaporator for 90 minutes at 70° C. The product was 12.1 g. of a viscous syrup which crystallized on standing. The sample was filtered and the solids washed thoroughly with acetic acid. (Yield 6.0 g. of dried solids.)

The solid product was 91.85% active ethanecarbonyl-1,2-diphosphonic acid by acid-base titration, gave the correct $H^1$ and $P^{31}$ NMR spectra for ethanecarbonyl-1,2-diphosphonate, and had the following elemental analysis.

Found (percent): C, 10.8; H, 3.6; P, 28.2; $H_2O$, 8.1; Cl, >0.1. Theory (for ECnDP·1$H_2O$) (percent): C, 10.81; H, 3.63; P, 27.90; $H_2O$, 8.11; Cl, 0.

The anhydrous ethanecarbonyl-1,2-diphosphonic acid used in Example II was prepared in the following manner.

The acetic acid washings from the crystallization of ECnDP·1H$_2$O acid (preceding preparation) were concentrated on the rotary evaporator to 6.0 g. of syrup. The sample crystallized on standing four days in the lab. The crystalline slurry was diluted with 20 cc. of acetic acid and filtered. (Yield 2.1 g. of dried solids.)

The solids titrated as 99.9% active ethanecarbonyl-1,2-diphosphonic acid by acid-base titration and assayed as 91% ethanecarbonyl-1,2-diphosphonate, 9% miscellaneous phosphorus by P$^{31}$NMR analysis (percent of total P).

EXAMPLE I

Ethanecarbonyl - 1,2 - diphosphonic acid monohydrate (4.46 g.; 0.02 mole) was slurried in 18 cc. of propyl sulfone and PCl$_3$ (1.9 cc.; 0.022 mole) was added at 29° C. The slurry quickly resolved to two liquid phases and the temperature rose to 35° C. The reaction mixture was heated slowly to 90° C. over a 1½ hour period. The reaction mixture had formed white solids at this point. The slurry was digested for 3 hours at 90° C. then filtered. The solids (yield 6.8 g. of dry solids) were washed with ethyl ether and dried under nitrogen. The solid, identified as the condensate of ethane-1-hydroxy-1,1,2-triphosphonate by NMR and by an X-ray diffraction pattern is readily converted to the free ethane-1-hydroxy-1,1,2-triphosphonic acid.

EXAMPLE II

Anhydrous ethanecarbonyl-1,2-diphosphonic acid (4.08 g.; 0.02 mole) was slurried in 30 cc. of acetic acid at 63° C., and P$_4$O$_6$ (1.10 g.; 0.005 mole) was added. A temperature of 65° C. was maintained for one hour, then 10 cc. of water was added. The reaction mixture was assayed by P$^{31}$ and H$^1$NMR spectra. By P$^{31}$NMR the phosphorus was distributed as follows: 27% unreacted ethanecarbonyl-1,2-diphosphonic acid (ECnDP), 17% unreacted HPO$_3$H$_2$, 56% ethane-1-hydroxy-1,1,2-triphosphonic acid (EHTP) (percent of total P). By H$^1$NMR, the EHTP, ECnDP, and HPO$_3$$^{-2}$ protons were all detectable; no EHDP was detectable in the sample indicating <5% EHDP produced by the reaction.

The foregoing description of the present invention has been presented describing certain operable and preferred embodiments. It is not intended that the invention should be so limited since variations and modifications thereof will be obvious to those skilled in the art, all of which are within the spirit and scope of this invention.

What is claimed is:

1. A process for making ethane-1-hydroxy-1,1,2-triphosphonic acid which comprises reacting ethanecarbonyl - 1,2 - diphosphonic acid with substantially a stoichiometric amount of a compound selected from the group consisting of phosphorous trihalides and phosphorous acid anhydrides at a temperature in the range of from about 30° C. to about 160° C. for from about 5 minutes to about 24 hours under substantially anhydrous acidic reaction conditions in sufficient acetic acid solvent to allow adequate stirring to form a condensate of ethane-1-hydroxy-1,1,2-triphosphonic acid.

2. A process according to claim 1 in which said condensate of ethane-1-hydroxy-1,1,2-triphosphonic acid is hydrolyzed by the addition of water.

3. A process according to claim 1 in which said compound is phosphorous trichloride.

4. A process according to claim 1 wherein said compound is P$_4$O$_6$.

5. A process according to claim 1 in which the reaction temperature is in the range of 50° C. to 140° C. for from about ¼ hour to about 12 hours.

6. A process according to claim 1 in which the anhydrizing power of the reaction system is from 1.5 to 3.5.

7. A process according to claim 6 in which the anhydrizing power of the reaction system is about 2.

References Cited

UNITED STATES PATENTS

| | | | |
|---|---|---|---|
| 3,366,677 | 1/1968 | Quimby | 200—502.4 A |
| 3,400,148 | 9/1968 | Quimby | 260—502.4 A |
| 3,468,935 | 9/1969 | Peck | 260—502.4 A |

FOREIGN PATENTS

| | | | |
|---|---|---|---|
| 1,082,235 | 5/1960 | Germany | 260—502.4 A |
| 1,102,525 | 2/1968 | Great Britain | 200—502.4 A |

LEON ZITVER, Primary Examiner

J. E. EVANS, Assistant Examiner

U.S. Cl. X.R.

252—142; 260—348 R